(12) United States Patent
Kurokawa

(10) Patent No.: US 9,321,212 B2
(45) Date of Patent: Apr. 26, 2016

(54) FILLED FLUORORESIN SHEET, PROCESS FOR PRODUCING THE SAME, AND GASKET

(75) Inventor: Shinya Kurokawa, Gojo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 102 days.

(21) Appl. No.: 13/258,251

(22) PCT Filed: Mar. 25, 2010

(86) PCT No.: PCT/JP2010/055269
§ 371 (c)(1),
(2), (4) Date: Sep. 21, 2011

(87) PCT Pub. No.: WO2010/113769
PCT Pub. Date: Oct. 7, 2010

(65) Prior Publication Data
US 2012/0022200 A1    Jan. 26, 2012

(30) Foreign Application Priority Data

Mar. 31, 2009   (JP) ................. 2009-084911

(51) Int. Cl.
| | |
|---|---|
| C08K 3/38 | (2006.01) |
| C08K 3/22 | (2006.01) |
| C08K 3/34 | (2006.01) |
| C08K 3/14 | (2006.01) |
| C08K 3/04 | (2006.01) |
| B29C 43/24 | (2006.01) |
| C08L 27/18 | (2006.01) |
| B29C 55/18 | (2006.01) |
| B29K 27/12 | (2006.01) |
| B29K 105/16 | (2006.01) |

(52) U.S. Cl.
CPC ............. B29C 55/18 (2013.01); *B29K 2027/12* (2013.01); *B29K 2105/16* (2013.01); *B29K 2995/007* (2013.01)

(58) Field of Classification Search
USPC ......... 524/404, 546, 406, 413, 408, 430, 443; 264/642
See application file for complete search history.

(56) References Cited

U.S. PATENT DOCUMENTS

| | | | |
|---|---|---|---|
| 4,208,194 A | 6/1980 | Nelson | |
| 5,738,936 A | 4/1998 | Hanrahan | |
| 2006/0234063 A1* | 10/2006 | Sasaki et al. | .................. 428/421 |
| 2009/0234061 A1 | 9/2009 | Kurokawa | |

FOREIGN PATENT DOCUMENTS

| | | | |
|---|---|---|---|
| EP | 2168998 A1 | 3/2010 | |
| JP | 59223754 A | 12/1984 | |
| JP | 60120798 A | 6/1985 | |
| JP | 6074810 B | 9/1994 | |
| JP | 8239682 A | 9/1996 | |
| JP | 9202664 A | 8/1997 | |
| JP | 10060206 A | 3/1998 | |
| JP | 2004323717 A | 11/2004 | |
| JP | 2007253519 A | 10/2007 | |
| JP | 2007296756 A | * 11/2007 | |
| JP | 2008013715 A | 1/2008 | |
| JP | 2010078111 A | 4/2010 | |

OTHER PUBLICATIONS

Machine translation of JP 2007-296756.*

* cited by examiner

*Primary Examiner* — Ling Choi
*Assistant Examiner* — Catherine S Branch
(74) *Attorney, Agent, or Firm* — The Webb Law Firm

(57) ABSTRACT

Provided is a filled fluororesin sheet excellent in stress relaxation properties, in particular stress relaxation properties at a high temperature. The filled fluororesin sheet includes a fluororesin and an inorganic filler having a revised Mohs hardness of not less than 8, in a fluororesin:inorganic filler volume ratio of 30-55:70-45 (wherein the total of the two is 100).

3 Claims, No Drawings

FILLED FLUORORESIN SHEET, PROCESS FOR PRODUCING THE SAME, AND GASKET

TECHNICAL FIELD

The present invention relates to a filled fluororesin sheet, a process for producing the same, and a gasket.

BACKGROUND ART

A filled fluororesin sheet is a sheet of a fluororesin containing a filler. The sheet shows chemical resistance and heat resistance of the fluororesin as well as the inherent functions and properties of the filler. In addition, the filler improves poor creep resistance of the fluororesin. The sheet thus has wide applications including sealing materials.

For use as sealing materials, the properties of fluororesins, for example creep properties, are improved by the addition of fillers such as metals, graphite and inorganic fillers. Such materials are used as gaskets and the like.

Filled fluororesin sheets suited as gasket materials are known in the art. For example, JP-A-2004-323717 (Patent Literature 1) discloses a filled fluororesin sheet suited as a gasket material which contains a swelling mineral and a filler (except swelling minerals).

JP-A-2007-253519 (Patent Literature 2) discloses a process for producing fluororesin sheets which includes a step of rolling a sheet-forming resin composition containing a fluororesin, a filler (such as talc or clay) and a specific solvent under specific conditions. The literature describes that the filled fluororesin sheet obtained by the process achieves high stress relaxation properties and high airtightness and is suited as a gasket material.

Further, fluororesin materials that contain a filler having a specific Mohs hardness are known in the art. For example, JP-B-H06-74810 (Patent Literature 3) discloses a slide member material that contains a polytetrafluoroethylene resin as a main component and 0.5 to 10 wt % of powder of at least one abrasive selected from chromium oxide, silicon carbide, aluminum oxide and mixtures containing at least one of these compounds, the abrasive powder having a Mohs hardness of not less than 5 and an average particle diameter of less than 5 μm. The literature describes that the use of the specific abrasive improves abrasion resistance properties of PTFE.

JP-A-H08-239682 (Patent Literature 4) discloses a slide member composition which is based on a synthetic resin including PTFE and contains 0.003 to 0.3% by volume of inorganic fine particles having a Mohs hardness of not less than 9 and an average particle diameter of not more than 10 μm. The literature describes that the addition in the trace amount of the inorganic fine particles having a high Mohs hardness to various synthetic resin materials realizes synthetic resin slide materials which have excellent abrasion resistance without damaging a mating member or increasing the friction therebetween.

However, gaskets that are composed of the conventional filled fluororesin sheets, for example clay- or talc-filled fluororesin sheets described in Patent Literatures 1 and 2, are still insufficient in terms of stress relaxation properties, in particular at a high temperature.

The present invention has been made in view of the problems in the art described above. It is therefore an object of the invention to provide a filled fluororesin sheet excellent in stress relaxation properties, in particular stress relaxation properties at a high temperature, a process for the production thereof, and a filled fluororesin sheet gasket having excellent stress relaxation properties.

Patent Literatures 3 and 4 do not teach or suggest that the high-hardness filler is added to the fluororesin (such as PTFE) to improve stress relaxation properties of the fluororesin sheet, or the fluororesin containing the high-hardness filler is used as a gasket material.

The present inventor carried out studies and has found that a fluororesin sheet containing a specific filler solves the problems described above. The present invention has been completed based on the finding.

SUMMARY OF THE INVENTION

A filled fluororesin sheet according to the invention comprises a fluororesin and an inorganic filler having a revised Mohs hardness of not less than 8, in a fluororesin:inorganic filler volume ratio of 30-55:70-45 (wherein the total of the two is 100).

A process for producing filled fluororesin sheets according to the invention comprises a step of rolling a sheet-forming resin composition which comprises a fluororesin, an inorganic filler having a revised Mohs hardness of not less than 8 and a processing aid and in which the volume ratio of the fluororesin and the inorganic filler (fluororesin:inorganic filler) is 30-55:70-45 (wherein the total of the two is 100).

The inorganic filler may be at least one material selected from the group consisting of diamond, hexagonal boron nitride, boron carbide, silicon carbide, silicon nitride, tungsten carbide, α-alumina, tantalum carbide, fused zirconia, garnet, topaz and zirconia.

A gasket according to the invention comprises the filled fluororesin sheet of the invention.

The filled fluororesin sheet of the invention has excellent stress relaxation properties, in particular at a high temperature.

The inventive process for producing filled fluororesin sheets can produce filled fluororesin sheets which have excellent stress relaxation properties, in particular excellent stress relaxation properties at a high temperature.

The gasket of the invention has excellent stress relaxation properties, in particular at a high temperature.

DETAILED DESCRIPTION OF THE INVENTION

The present invention will be described in greater detail hereinbelow.

Filled Fluororesin Sheets

A filled fluororesin sheet according to the invention contains a fluororesin and an inorganic filler having a revised Mohs hardness of not less than 8, in a fluororesin:inorganic filler volume ratio of 30-55:70-45 (wherein the total of the two is 100).

<Fluororesins>

Examples of the fluororesins include polytetrafluoroethylene resins (PTFEs), modified PTFEs, polyvinylidene fluoride resins (PVDFs), ethylene/tetrafluoroethylene copolymer resins (ETFEs), polychlorotrifluoroethylene resins (PCTFEs), tetrafluoroethylene/hexafluoropropylene ethylene copolymer resins (FEPs) and tetrafluoroethylene/perfluoroalkyl copolymer resins (PFAs). Of these, the polytetrafluoroethylene resins (PTFEs) are preferable in terms of processability in extrusion, rolling and the like, and PTFE obtained by emulsion polymerization is particularly preferable.

When PTFE is used as the fluororesin, any of the fluororesins mentioned above except PTFEs may be used in combination therewith in a small amount, for example 10% by mass (based on 100% by mass of the total of the fluororesins).

The fluororesin may be in the form of powder. Alternatively, a dispersion of the fluororesin fine particles in water may be mixed with an inorganic filler described later, and thereafter water may be removed from the dispersion.

The fluororesin and an inorganic filler described later are used in a fluororesin:inorganic filler volume ratio of 30-55:70-45, and preferably 40-55:60-45 (wherein the total of the two is 100). This volume ratio ensures that the obtainable filled fluororesin sheet shows excellent stress relaxation properties at a high temperature. If the proportion of the inorganic filler is much smaller than the above range (if the proportion of the fluororesin is much larger than the above range), the inorganic filler will not be able to suppress sufficiently the flow of the fluororesin at a high temperature, resulting in a deterioration in stress relaxation properties of the fluororesin sheet at a high temperature (the stress relaxation percentage is increased).

<Fillers>

The filler used in the invention is an inorganic filler having a revised Mohs hardness of not less than 8, and preferably not less than 12. The filler allows the filled fluororesin sheet of the invention to show excellent stress relaxation properties at high temperatures.

Specific examples of the inorganic fillers include diamond (revised Mohs hardness=15), hexagonal boron nitride (revised Mohs hardness=14), boron carbide (revised Mohs hardness=14), silicon carbide (revised Mohs hardness=13), silicon nitride (revised Mohs hardness=12), tungsten carbide (revised Mohs hardness=12), α-alumina (revised Mohs hardness=12), tantalum carbide (revised Mohs hardness=11), fused zirconia (revised Mohs hardness=11), garnet (revised Mohs hardness=10), topaz (revised Mohs hardness=9) and zirconia (revised Mohs hardness=8). These may be used singly, or two or more may be used in combination.

The inorganic fillers preferably have an average particle diameter of 3 to 30 μm and more preferably 4 to 20 μm. Herein, the value of the average particle diameter is a value measured by a laser diffraction scattering method (measurement range (particle diameters): 0.03 to 1000 μm).

<Filled Fluororesin Sheets>

The filled fluororesin sheets of the invention that have the above configuration are excellent in stress relaxation properties, in particular stress relaxation properties at a high temperature. In detail, the stress relaxation percentage at 200° C. (in accordance with JIS R3453 except that the heating temperature is changed from 100° C. to 200° C.) is preferably not more than 40%, and more preferably not more than 35%.

The filled fluororesin sheets of the invention may be used as gaskets because of their excellent stress relaxation properties, in particular excellent stress relaxation properties at a high temperature. A gasket composed of the filled fluororesin sheet of the invention can be used over a long term at a high temperature (for example, 200° C. or above).

The gasket of the invention may be easily manufactured by cutting the inventive filled fluororesin sheet to the desired shape.

[Processes for Producing Filled Fluororesin Sheets]

The filled fluororesin sheet of the invention may be produced by a known process except that the specific filler described above is used.

The production process may be a rolling process or a skiving process. A rolling process is preferable.

An exemplary rolling process includes a rolling step of rolling an extrudate of a raw material composition that includes the fluororesin, the inorganic filler and a processing aid containing not less than 30% by mass (based on 100% by mass of the processing aid) of a petroleum hydrocarbon solvent having a fractionation temperature of not more than 120° C. In the rolling step, the composition is rolled at a roll temperature of 40 to 80° C. Details in this process such as the processing aids and the production conditions are described in Patent Literature 2.

The rolling process for the production of the filled fluororesin sheets generally includes a stirring step, a preforming step, the rolling step, a drying step and a calcining step in this order.

<Stirring Step>

In the stirring step, the fluororesin, the inorganic filler and the processing aid are stirred and mixed together in an arbitrary order to give a sheet-forming resin composition. When a bad stirring efficiency is encountered, the processing aid may be added in a large amount and the extra portion of the processing aid may be removed by filtration after the completion of the stirring.

The kinds and the amounts of the fluororesin and the inorganic filler may be determined appropriately in accordance with the target composition of the fluororesin sheet to be manufactured.

The processing aids may be known processing aids such as petroleum hydrocarbon solvents, alcohols and water. Commercial petroleum hydrocarbon solvents include Isoper C, Isoper G and Isoper M (Exxon Mobil Corporation).

<Preforming Step>

In the preforming step, the sheet-forming resin composition is extruded into a preform (an extrudate).

A known extruder may be used in the extrusion.

In the extrusion, the composition may be heated as required at a temperature that will not cause the volatilization of much of the processing aid and other components contained in the composition.

The shape of the extrudate (preform) is not particularly limited. However, a rod-like or ribbon-like shape is desirable in consideration of the efficiency in the subsequent sheet production and the homogeneity of the sheet properties.

In the production process of the present invention, it is preferable that the processing aid is gradually volatilized in the rolling step described below. Accordingly, the stirring step and the preforming step are preferably carried out at a temperature that is lower than the roll temperature in the rolling step in order to avoid the volatilization of the processing aid.

<Rolling Step>

In the rolling step that is performed after the preforming step, the preform is passed through rollers such as a two-roll mill and is thereby rolled and shaped into a sheet.

The production process of the invention preferably includes a step of further rolling the rolled sheet resulting from the rolling step. Namely, the rolling step is preferably repeated several times (for example, 3 to 50 times), thereby further densifying the fluororesin sheet. In repeating the rolling step, the distance between the rolls is narrowed after each rolling.

When the preform is rolled into a sheet with a two-roll mill, the distance between the rolls may be set at 0.5 to 20 mm and the roll surface moving speed (the sheet extrusion rate) may be 5 to 50 mm/sec.

<Drying Step>

In the drying step, the rolled sheet is allowed to stand at ordinary temperature or is heated at a temperature not more than the melting point of the fluororesin, thereby removing the processing aid.

<Calcining Step>

In the calcining step, the dried sheet is heated at a temperature not less than the melting point of the fluororesin and is thereby sintered. In consideration that the entire sheet has to be calcined homogeneously and that a fluorine-containing harmful gas is generated at an excessively high temperature, the heating temperature is appropriately in the range of, for example, 340 to 370° C., although slightly variable in accordance with the kind of the fluororesin.

EXAMPLES

The production process according to the present invention will be described in detail by presenting examples hereinbelow without limiting the scope of the invention.
<Testing Methods>
Stress Relaxation Properties:

A test piece was obtained from a 1.5 mm thick sheet. The test piece was tested in accordance with JIS R3453 except that the heating temperature was changed from 100° C. to 200° C., thereby determining the stress relaxation percentage.

Example 1

PTFE fine powder (CD-1, manufactured by ASAHI GLASS CO., LTD., density: 2.2 g/cm$^3$) 1,000 g;

silicon carbide (No. 1200, manufactured by SHOWA DENKO K. K., revised Mohs hardness: 13, average particle diameter: approximately 10 µm, density: 3.2 g/cm$^3$) 1,450 g;

Isoper C (a hydrocarbon organic solvent, fractionation temperature: 97-104° C., Exxon Mobil Corporation) 250 g; and Isoper G (a hydrocarbon organic solvent, fractionation temperature: 158-175° C., Exxon Mobil Corporation) 250 g
were mixed together in a kneader for 5 minutes. The resultant mixture was aged by being allowed to stand at room temperature (25° C.) for 16 hours, thereby preparing a sheet-forming composition.

The composition was extruded at room temperature (25° C.) using an extruder having a 300 mm×20 mm orifice. Thus, a preform was prepared.

The preform was rolled with a two-roll mill having a roll diameter of 700 mm, at a roll interval of 20 mm, a roll speed of 6 m/min and a roll temperature of 40° C. Immediately after this rolling, the sheet was rolled again at a roll interval of 10 mm. Immediately thereafter, the sheet was rolled at a roll interval of 5 mm. Immediately after this rolling, the sheet was rolled for the last time at a roll interval of 1.5 mm. Thus, a 1.5 mm thick sheet was obtained.

The sheet was allowed to stand at room temperature (25° C.) for 24 hours and thereby the solvent was removed. The sheet was calcined in an electric furnace at 350° C. for 3 hours. A sheet gasket was thus manufactured.

The stress relaxation percentage of the sheet gasket was 29%.

Example 2

A sheet gasket was manufactured in the same manner as in Example 1, except that the silicon carbide was replaced by 1,770 g of α-alumina (A-42, manufactured by SHOWA DENKO K. K., revised Mohs hardness: 12, average particle diameter: approximately 4 µm, density: 3.9 g/cm$^3$). The stress relaxation percentage of the sheet gasket was 31%.

Comparative Example 1

A sheet gasket was manufactured in the same manner as in Example 1, except that the silicon carbide was replaced by 1,180 g of clay (NK-300, manufactured by SHOWA KDE CO., LTD., revised Mohs hardness: 2.5, average particle diameter: 10 density: 2.6 g/cm$^3$). The stress relaxation percentage of the sheet gasket was 50%.

Comparative Example 2

A sheet gasket was manufactured in the same manner as in Example 1, except that the silicon carbide was replaced by 1,270 g of talc (K-1, manufactured by Nippon Talc Co., Ltd., revised Mohs hardness: 1, average particle diameter: 7 µm, density: 2.8 g/cm$^3$). The stress relaxation percentage of the sheet gasket was 58%.

Comparative Example 3

A sheet gasket was manufactured in the same manner as in Example 1, except that the amount of the α-alumina was changed from 1,770 g to 1,090 g.

The stress relaxation percentage of the sheet gasket was 51%.

TABLE 1

| Items | | | unit | Ex. 1 | Ex. 2 | Comp. Ex. 1 | Comp. Ex. 2 | Comp. Ex. 3 |
|---|---|---|---|---|---|---|---|---|
| PTFE | | CD-1 | g | 1,000 | 1,000 | 1,000 | 1,000 | 1,000 |
| Inorganic fillers | silicon carbide | #1200 | g | 1,450 | | | | |
| | α-alumina | A-42 | g | | 1,770 | | | 1,090 |
| | clay | NK-300 | g | | | 1,180 | | |
| | talc | K-1 | g | | | | 1,270 | |
| PTFE volume proportion (relative to 100% by volume of PTFE and filler combined) | | | % by volume | 50 | 50 | 50 | 50 | 62 |
| Aids | | Isoper C | g | 125 | 125 | 125 | 125 | 125 |
| | | Isoper G | g | 125 | 125 | 125 | 125 | 125 |
| Thickness | | | mm | 1.5 | 1.5 | 1.5 | 1.5 | 1.5 |
| Stress relaxation percentage | | | % | 29 | 31 | 50 | 58 | 51 |

The invention claimed is:

1. A process for producing filled fluororesin sheets, comprising
a rolling step of rolling a sheet-forming resin composition which comprises a fluororesin, an inorganic filler having a revised Mohs hardness of not less than 8 that is selected from the group consisting of silicon carbide and α-alumina, and a processing aid and in which the volume ratio of the fluororesin and the inorganic filler (fluororesin:inorganic filler) is 30-55:70-45 (wherein the total of the two is 100),
a drying step in which the sheet that has been rolled in the rolling step is allowed to stand at ordinary temperature or is heated at a temperature not more than the melting point of the fluororesin, thereby removing the processing aid, and a calcining step of heating the dried sheet at a temperature not less than the melting point of the fluororesin to sinter the sheet.

2. A filled fluororesin sheet produced by the process of claim 1.

3. A gasket comprising the filled fluororesin sheet of claim 2.

* * * * *